(12) United States Patent
Peterson et al.

(10) Patent No.: US 7,932,905 B2
(45) Date of Patent: Apr. 26, 2011

(54) METHOD, APPARATUS, AND COMPUTER READABLE MEDIUM FOR LIGHT ENERGY ACCOUNTING IN RAY TRACING (75) Inventors: Luke Tilman Peterson, Park City, UT (US); James Alexander McCombe, San Francisco, CA (US); Ryan R. Salsbury, San Francisco, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 831 days.

(21) Appl. No.: 11/872,593

(22) Filed: Oct. 15, 2007

(65) Prior Publication Data
US 2009/0096789 A1 Apr. 16, 2009

(51) Int. Cl.
*G06T 15/50* (2011.01)
(52) U.S. Cl. ........ 345/426; 345/419; 345/420; 345/421; 345/422; 345/423; 345/424; 345/427; 345/581; 345/619; 345/622
(58) Field of Classification Search .................. 345/419, 345/420, 421, 422, 423, 424, 426, 427, 581, 345/619, 622
See application file for complete search history.

(56) References Cited

U.S. PATENT DOCUMENTS

| 5,313,568 | A |   | 5/1994 | Wallace et al. |
|---|---|---|---|---|
| 5,933,146 | A |   | 8/1999 | Wrigley |
| 6,028,608 | A | * | 2/2000 | Jenkins ........................ 345/619 |
| 6,111,582 | A |   | 8/2000 | Jenkins |
| 6,556,200 | B1 |   | 4/2003 | Pfister et al. |
| 7,009,608 | B2 | * | 3/2006 | Pharr et al. .................... 345/426 |
| 7,012,604 | B1 |   | 3/2006 | Christie et al. |
| 7,030,879 | B1 | * | 4/2006 | Pharr ............................. 345/426 |
| 7,071,938 | B2 |   | 7/2006 | Herken et al. |
| 7,098,907 | B2 |   | 8/2006 | Houston et al. |
| 7,212,207 | B2 |   | 5/2007 | Green et al. |
| 7,250,948 | B2 |   | 7/2007 | Hayes et al. |

(Continued)

FOREIGN PATENT DOCUMENTS
WO    WO 2008/037599 A1    4/2008

OTHER PUBLICATIONS

E. Gröller and W. Purgathofer, "Coherence in Computer Graphics," Institute for Computer Graphics, Technical University Vienna, Vienna, Austria, Trans. on Information and Communication Technologies, vol. 5, 1993 WIT Press.

(Continued)

*Primary Examiner* — Kimbinh T Nguyen
(74) *Attorney, Agent, or Firm* — Michael S. Garrabrants; Novak Druce + Quigg LLP (57) ABSTRACT

For ray tracing systems, described methods, media, apparatuses provide for accounting of light energy that will be collected at pixels of a 2-D representation without recursive closure of a tree of ray/primitive intersections, and also provide for adaptivity in ray tracing based on importance indicators of each ray, such as a weight, which may be carried in data structures representative of the rays. Examples of such adaptivity may include determining a number of children to issue for shading an identified intersecting primitive, culling rays, and adding rays to achieve more accurate sampling, if desired. All such adaptivity may be triggered with goal-based indicators, such as a threshold value representative of rendering progress to a time-based goal, such as a frame rate.

23 Claims, 4 Drawing Sheets

U.S. PATENT DOCUMENTS

| | | | |
|---|---|---|---|
| 7,289,118 | B2 | 10/2007 | Schmittler et al. |
| 7,348,975 | B2 | 3/2008 | Reshetov et al. |
| 7,479,962 | B2 | 1/2009 | Herken et al. |
| 7,688,320 | B2 * | 3/2010 | Shearer .................. 345/426 |
| 7,782,318 | B2 * | 8/2010 | Shearer .................. 345/426 |
| 2005/0264568 | A1 | 12/2005 | Keller |
| 2008/0028154 | A1 | 1/2008 | Hoover et al. |
| 2008/0049017 | A1 | 2/2008 | Shearer |
| 2008/0074420 | A1 | 3/2008 | Kuesel et al. |
| 2008/0074421 | A1 * | 3/2008 | Hayes ................. 345/426 |
| 2008/0122841 | A1 | 5/2008 | Brown et al. |
| 2008/0180442 | A1 | 7/2008 | Brown et al. |
| 2008/0211804 | A1 * | 9/2008 | Hempel et al. ............ 345/419 |

OTHER PUBLICATIONS

Eric Lafortune, "Mathematical Models and Monte Carlo Algorithms for Physically Based Rendering," Ph. D. thesis, Department of Computer Science, Faculty of Engineering, Katholieke Universiteit Leuven, Feb. 1996.

William J. Morokoff and Russel E. Caflisch, "Quasi-random sequences and Their discrepancies," SIAM Journal on Scientific Computing, vol. 15, Issue 6, Nov. 1994, pp. 1251-1279, Philadelphia, PA.

Peter Shirley, Changyaw Wang and Kurt Zimmerman "Monte Carlo Techniques for Direct Lighting Calculations," ACM Transactions on Graphics, vol. 15, Issue 1, Jan. 1996, pp. 1-36, ACM, New York, New York.

William J. Morokoff and Russel E. Caflisch, "Quasi-Monte Carlo Integration," Journal of Computational Physics, vol. 122, Issue 2, Dec. 1995, pp. 218-230,1995, published by Academic Press Professional, Inc., San Diego, CA.

Gerhard Hummer, Lawrence R. Pratt and Angel E. Garcia, "On the free energy of ionic hydration," The Journal of Physical Chemistry, 1995 (Available online at http://arxiv.org/PS_cache/chem-ph/pdf/9505/9505005v1.pdf, last visited Oct. 30, 2009).

Stefan Heinrich and Alexander Keller, "Quasi-Monte Carlo Methods in Computer Graphics, Part II: The Radiance Equation," Technical Report 243/94, Fachbereich Informatik, AG Numerische Algorithmen, Universit"at Kaiserslautern, 1994.

F James, "Monte Carlo theory and practice," Reports on Progress in Physics, vol. 43, 1980, pp. 1145-1189, The Institute of Physics, Great Britain.

Stefan Heinrich and Alexander Keller, "Quasi-Monte Carlo Methods in Computer Graphics, Part I: The QMC Buffer," Technical Report 242/94, Fachbereich Informatik, AG Numerische Algorithmen, Universit"at Kaiserslautern, 1994.

Russel E. Caflisch and Bradley Moskowitz, "Modified Monte Carlo Methods Using Quasi-Random Sequences," Lecture Notes in Statistics 106, Dec. 1994, Mathematics Department, UCLA, Los Angeles, CA.

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009.

* cited by examiner

FIG. 1

| 205 | 210 | 215 | 220 | 225 |
|---|---|---|---|---|

METHOD, APPARATUS, AND COMPUTER READABLE MEDIUM FOR LIGHT ENERGY ACCOUNTING IN RAY TRACING

BACKGROUND

1. Field

The present invention generally relates to rendering two-dimension representations from three-dimensional scenes, and more particularly to accelerating ray tracing for such rendering.

2. Description of Related Art

Rendering photo-realistic images with ray tracing is known in the computer graphics arts to have the ability to produce photo-realistic images, including realistic shadow and lighting effects, because ray tracing models the physical behavior of light interacting with elements of a scene. However, ray tracing is also known to be computationally intensive, and at present, even a state of the art graphics workstation requires a substantial amount of time to render a complicated, high resolution scene using ray tracing.

Ray tracing usually involves obtaining a scene description composed of geometric primitives, such as triangles, that describe surfaces of structures in the scene. For example, a scene may comprise a car on a street with buildings on either side of the street. The car in such a scene may be defined by a large number of triangles (e.g., 1 million triangles) that approximate a continuous surface. A camera position from which the scene is viewed is defined. An image plane of a selected resolution (e.g., 1024×768 for an SVGA display) is disposed at a selected position between the camera and the scene.

A principal objective of ray tracing is to determine a color and intensity for each pixel of the image plane, such that this image can thereafter be displayed on a monitor, for example. In the physical world, viewing such a scene from the camera's perspective would result in light rays reaching the camera that owe their existence to one or more light sources, including diffuse and directed light sources. In the physical world, these light sources project light energy into the scene, and this light energy is transmitted, diffracted, reflected, and/or absorbed according to the types of materials that the light contacts, and the order in which they are contacted, during its journey from light source to the camera. This process is what ray tracing attempts to duplicate.

Although the physical world operates by light energy being traced from a source to the camera, only a small portion of the light generated by a source arrives at the camera. Therefore, it has been recognized that rays, for most circumstances, should be traced from the camera back to determine intersections with light sources.

A ray tracing algorithm mainly involves casting one or more rays from the camera through each pixel of the image into the scene. Each ray is then tested against each primitive composing the scene to identify a primitive which that ray intersects, then it is determined what effect that primitive has on the ray, for example reflecting and/or refracting it. Such reflection and/or refraction causes the ray to proceed in a different direction, and/or split into multiple secondary rays, which can take different paths. All of these secondary rays are then tested against the scene primitives to determine primitives they intersect, and the process recursively continues until the secondary (and tertiary, etc.) ray terminates by, for example, leaving the scene, or hitting a light source. While all of these ray/primitive intersections are being determined, a tree mapping them is created. After a ray terminates, the contribution of the light source is traced back through the tree to determine its effect on the pixel of the scene.

Once a primitive has been identified as being intersected by a ray, shading calculations are done to determine what effect the intersection has. These shading calculations are usually specified by shader code specific for a material assigned to the primitive intersected. Texture information can also be used during such shading calculations. The shader code specifies how the ray will interact with the primitive, such as whether the ray will be reflected or refracted, as well as whether additional rays will be spawned based on that intersection. These additional rays are for determining properties of the primitive intersected and as such the color of the primitive at the intersection point is not determined until these additional rays are resolved by additional ray tracing operations.

Thus, even though an intersection has been determined, without completing the additional ray tracing, which may in turn lead to additional shading for additional intersections, the color of the intersected primitive is not yet determined, which is why most ray tracers build a tree of intersections, and after identifying an end point, color information is prorogated back "up" through the tree to the originally emitted rays, through the primitives intersected by satisfying the outstanding data requirements of each shader for those intersected primitives.

Matt Pharr, et al. in "Rendering Complex Scenes with Memory-Coherent Ray Tracing" Proceedings of SigGraph (1997) ("Pharr" herein) discloses aspects of a way, and its applicability in certain ray tracing situations, to avoid recursing up a tree of rays to determine a contribution by a ray to a pixel. Pharr discloses a decomposition of the computation for the outgoing radiance at a point into a sum of incoming radiances, and Pharr states that such decomposition allows rays to be processed independently from each other, with some limitations. Pharr attributes the concept of such decomposition to Cleary J. M., et al, "Multiprocessor Ray Tracing" *Computer Graphics Forum* 5(1):3-12, March 1986 ("Cleary").

Cleary proposes subdividing a 3-D scene into a plurality of cubes, assigning tracing rays in each cube to a processor, and linking each processor to each of its neighbors. Rays are emitted into the scene from one face of the cube (where the face is subdivided into pixels representing screen pixels), and results of local ray shading computations are passed back through links to the face for use in determining colors of pixels at the face.

SUMMARY

In a first aspect, a computer readable medium stores computer readable instructions for machine execution of a method for adaptively ray tracing a three-dimensional scene composed of primitives using intermediate ray shading results. The method comprises emitting rays from a plurality of samples, each ray associated with a respective identification of a location of the sample from which it was emitted, a direction, and a weight. The method also comprises providing the rays for intersection testing with primitives, and receiving indications of identified intersections between rays and primitives. Each indication is associated with information sufficient to identify one of the rays and the primitive which the ray intersects. In response to receiving each indication, the method also comprises processing the respective identified intersection between the identified ray and the identified primitive. The processing performed includes determining, based at least on the weight of the ray identified in the indication, a ray tracing adaptation implemented by adjusting one or more of a number of rays emitted and a number of child rays to be emitted for further intersection testing in the scene. The method can be repeated for the child rays.

These adaptations can include culling child rays, or other rays, such as camera rays, or any other ray in the system, based at least in part on ray weight(s). Such ray weight(s) include a weight associated with the ray to be culled, and/or a ray which will be a parent for newly emitted rays, or weights associated with other rays in the system. A weight of a parent ray can be distributed among its child rays in any manner, including any programmatical distribution, or even pseudo-random or random distributions. It is not required, however, that any given amount or percentage of the weight of a parent ray be distributed or otherwise accounted for during the ray tracing.

These aspects can be used for implementing adaptations directed to maintaining rendering quality to an extent possible while meeting other goals, such as a goal related to rendering speed, like a frame rate goal. These adaptations can thus implement a progressive rendering refinement capability by selecting more accurate but computationally expensive rendering methods based on availability of resources, such as time and processing resources.

Other aspects include a computer readable medium storing computer readable instructions for machine execution of a method for adaptively ray tracing a three-dimensional scene composed of primitives. The method comprises emitting rays from a plurality of samples, each ray associated with a respective identification of a location of the sample from which it was emitted, a direction, and a weight. A sum of the weights of the rays emitted from a sample correlates with a weight value associated with that sample. The method includes providing the rays for intersection testing with primitives, and receiving indications of identified intersections between rays and primitives. The indications are associated with information sufficient to identify one of the rays and the primitive that the ray intersects. In response to receiving each indication, if the primitive intersected by the identified ray is associated with an emissive shader, then light energy is contributed to the sample from which the identified ray was emitted. A color of the sample is determined by blending an existing color of the sample with a color determined based on a proportion determined at least by the weight associated with the identified ray and the weight associated with the sample.

Some aspects can also include determining to refine the color of the light energy contributed by the identified ray. In response to such determination to refine, further rays may be emitted, and the weight of the sample can be revised based at least on a number of emitted further rays.

A computer readable medium storing computer readable instructions for machine execution of a method for adaptively ray tracing a three-dimensional scene composed of primitives. The method comprises emitting rays from a plurality of samples, each ray associated with a respective identification of a location of the sample from which it was emitted, a direction, and a weight, wherein the weight of each ray initially is selected such that the weights of all the rays for each sample correlate with the total light energy expected to be collected at that sample. The rays may be provided for intersection testing with primitives.

Indications of identified intersections between rays and primitives are received. Such indications are used to identify one of the rays and the primitive which the ray intersects. In response, rays associated with the sample associated with the indicated ray are considered as a group, and it is determined whether the rays currently associated with the sample, in view of the received indication, are sufficient to determine a color of the sample. The method then comprises adjusting a number of rays emitted from the sample in response to such sufficiency determination, the adjustment based on whether there was an over sufficiency or under sufficiency of information for determining the color of the sample. A higher quality rendering is often required for primitives directly visible from the sample from which the ray was emitted, rather than those which are not.

Still further aspects can include computer implemented methods of controlling adaptive rendering of a scene composed of primitives. The methods comprise determining a plurality of rays to emit for intersecting testing during rendering of a two-dimensional image of a three-dimensional scene composed of primitives, and submitting a ray of the plurality for intersection testing in an intersection testing resource. The method also comprises receiving an indication of an intersection between the submitted ray and one of the primitives composing the scene, and then determining a relative importance of the submitted ray to the scene rendering. The method also comprises causing a number of child rays of the submitted ray to be emitted for intersection testing, wherein the number is determined at least in part based on the relative importance of the submitted ray. The method may further comprise determining an algorithm which determines the number of child rays. The algorithm determined at least in part based on a metric relating to scene rendering progress and the relative importance of the submitted ray.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Ray tracing involves tracing paths of rays traveling in a scene as the rays intersection with, reflect, transmit through, and/or refract from objects in the scene, and more specifically with primitives composing objects in the scene. To begin, rays traveling in the scene owe their existence to the emission of camera rays that are each associated with a respective sample in a 2-D representation that will ultimately be displayed. Complex scenes may require a large number of primitives to fully compose the scene.

A 3-D scene may be described by sets of vertices for all the geometry in the scene, texture images, series of instructions that describe the way materials interact with light rays and a virtual eye (camera) from which the scene is to be viewed, procedural geometry, and the like. For example, geometry data comprising a number of triangles (a triangle is one example of a variety of primitives than can be used to represent scene geometry, and hence is geometry data) can represent a shape of an object or a portion of an object, such as a house, car, or human. Any or all elements of a scene can change or translate, or otherwise be required to redisplay at a high frequency to facilitate live animation.

Figure 1:
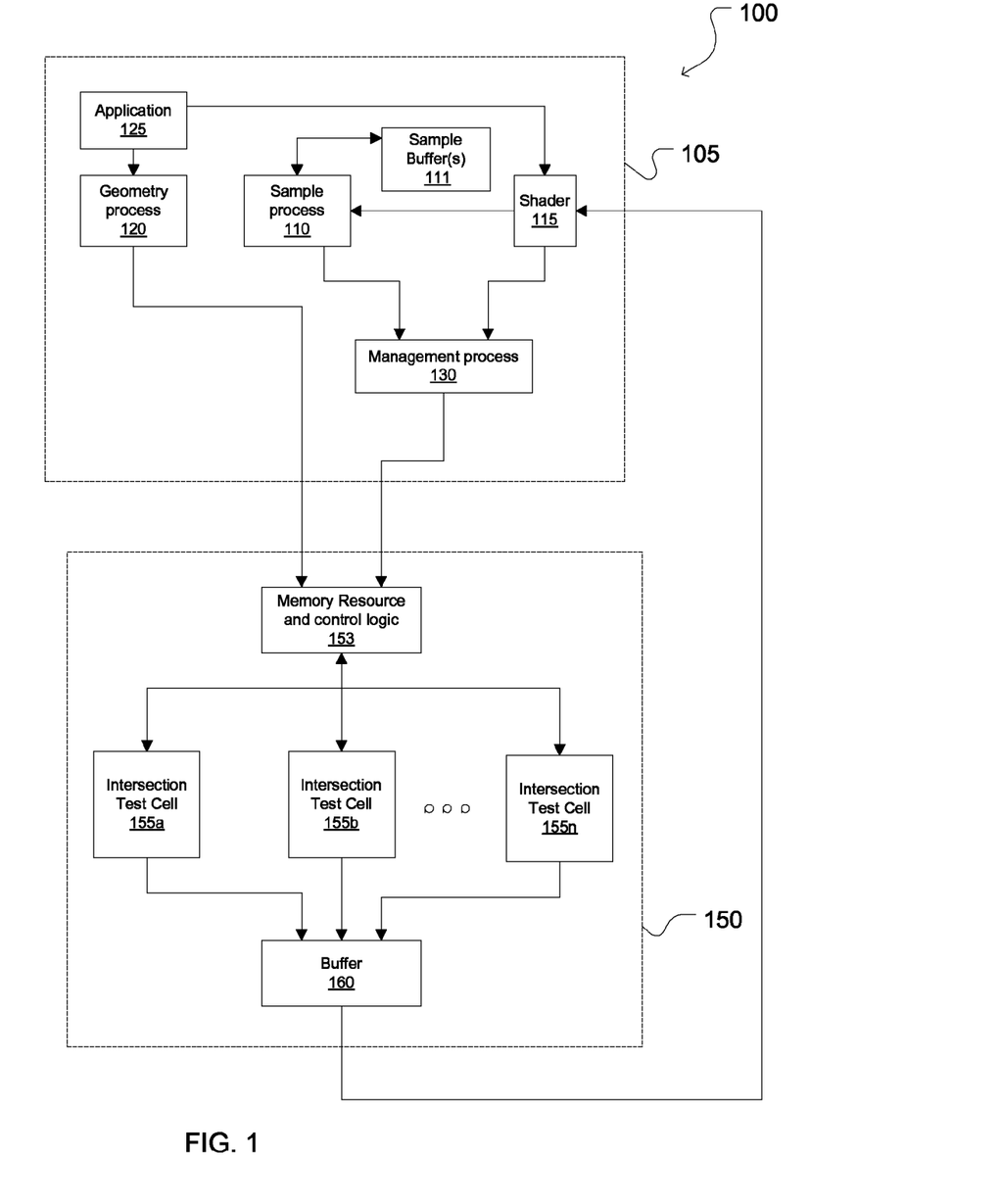
FIG. 1 illustrates a system that may implement aspects described herein.

As an example, FIG. 1 includes a block diagram of an example rendering system 100, which can be used in a system for rendering a two-dimensional representation of a three-dimensional scene based on a description of the scene. An overview of the operation of components of the rendering system, and with what data such components operate, is provided below.

Rendering system 100 comprises a host processor 105 on which may run sample process 110, application 125, and geometry process 120, and shader 115. Geometry process 120 may receive an input set of vertices, for example, arranged as triangles, and executes a series of instructions for each vertex to transform it to a final position in world coordinates from an application 125.

As an example, in animation, successive frames of scene description can be passed through geometry process 120 for processing that results in processed geometry data (e.g., primitives resulting from sets of vertices) and other data for use in other units of rendering system 100, and in particular for use in intersection testing resource 150.

Geometry process 120 also may generate geometry acceleration data that comprises shapes which bound selections of primitives of the scene. The geometry acceleration data may be provided to intersection testing resource for use in speeding up identification of primitives intersected by rays.

Other information that can be associated with geometry data includes material information, such as surface characteristics, like transmittivity, reflectivity, color, roughness, dielectric characteristics, and so on. Such characteristics can be described by a program associated with the geometry data, or by other means. In example host processor 105, application 125 can provide such data to shader 115. Shader 115 also may access geometry data.

Although shader 115 is illustrated as a single entity, shaders usually are specific to materials, such as skin, hair, water, and so on; shaders can refer more generally to any sort of procedure performed to determine a color of a primitive intersected in a scene by a ray. Shaders may also access texture data associated with the materials, which also would vary based on the material. Thus, shader 115 represents the general case where a number of different processes, each used in determining a color of a different primitive intersected by a different ray, may be running on host processor 105 at a given time.

Also, a shader may be programmed to call any number of standardized procedures, such as "get diffuse lighting." These standardized procedures can be used like a utility by the shader, which can use the results returned from the procedure in its own calculations and processes. As will be described below, these standardized procedures or other utilities used by shaders can be modified according to implement adaptive ray tracing aspects described herein Sample process 110 emits rays as an input to intersection testing resource 150. These rays can originate from a camera position or any arbitrary origin in the scene. Sample process 110 can determine to generate certain rays based on a variety of operations or calculations, such as operations to determine present scene quality or solution of certain lighting effects, that it performs. Sample process 110 can also perform other operations, which can include, but are not limited to, calculation of the standard deviation of sample values with respect to neighboring samples, filtering of sample data with respect to neighboring samples, and adjustment and scaling of sample values and variety of 2D signal processing operations on the samples. Finally, sample process 110 is configured to transform results of ray tracing calculations into final pixel color values for display, storage, and/or for other processing.

Aspects of how sample unit 110 may be involved in implementing adaptive ray tracing aspects are presented below, after treatment of intersection testing aspects.

Intersection testing resource 150 receives ray data from sample process 110 and/or shader 115, and primitive data (and optionally geometry acceleration data) from geometry process 120. Intersection testing resource 150 identifies which rays intersect which primitives, and sends indications of such ray/primitive intersections to shader process 115 (of course, FIG. 1 represents an abstraction for discussion purposes, and actual implementations may provide different behavior. For example, such indications may be provided to a driver that instantiates a process (which may be called a shader) to determine a color of the primitive identified in the indication).

In this example, intersection testing resource 150 comprises a memory resource and control logic 153, and a plurality of intersection test cells 155a-155n. Indications of detected intersections are outputted through buffer 160 for receipt at host 105, where shaders can be instantiated in response thereto. These elements of intersection testing resource 150 function as a resource for identifying a closest primitive intersected by a ray, and can be implemented according to any suitable means. For example, intersection test cells 155a-155n can be general purpose processors, or single function test cells, or can even be processes running on a general purpose CPU. Multiple test cells are illustrated as an example of providing ability to provide parallel throughput in ray intersection testing, but such parallelization is not required.

Host processor 105 is also illustrated as running a management process 130, which can be used in an implementation of ray tracing adaptations according to described aspects. In some implementations, management process 130 may not be required, as its functionality may be incorporated into shader processes, as evidenced from description below, such as description relating to FIG. 5.

Intersection Testing & Shading

Conventionally, intersection testing and shading for ray tracing proceeds by building a tree of identified intersections between rays and scene primitives, where the tree represents chains of child rays spawned to determine a color of a primitive at a point of intersection. For example, a ray is emanated through a pixel of a 2-D representation being rendered. The ray is tested for intersection in the scene until a closest intersection with a primitive is identified. Then, child rays may be spawned to sample diffuse and specular lighting conditions, and/or to determine whether a known light source is occluded by another object, such that the intersection point is in a shadow of that object. Some of these rays, such as diffuse and specular lighting child rays, can themselves intersect other objects, and in turn spawn further child rays.

In other words, in many cases, a shader for a primitive cannot determine a color of the intersected primitive without having information that must be obtained from results of additional shading calculations for other primitives or light sources in the scene, which involves further intersection testing to identify those primitives and light sources.

Such a process usually continues for each spawned ray until that ray either leaves the scene or hits a light source. For those rays that hit a light source, that light source can then be sampled to determine a color of the light from the source, which then determines the color of the ray. Then, the chain of intermediate intersections may be recursed, such that at each juncture, a present color of the ray, with results from shading of the next primitive determines a color of the next ray in the chain, until the ray that originally emanated from a pixel is reached, and then the contribution of that ray to the color of that pixel can be determined. At each shading step, a vector describing a color of incoming light may be multiplied by results from shading in order to determine a color of outgoing light for use at the next intersection in the tree.

Such a method requires storing all the intermediate intersections involved in each chain of rays in the tree, so that the tree can be recursed during closure of the shading calculations for each node in the tree. For example, data associated with an intersected primitive may indicate that the primitive is red, and shader 115 has access to that data. However, shader 115 would not have information about what color of light was being transmitted to or received by that primitive, and shader 115 would not be able to determine what color the primitive should be, with respect to the ray which intersected it, until further intersection is done to determine diffuse and specular light, for example.

A different method is to consider that each intersection can be independently resolved from the other intersections, if at each intersection, results of shading calculations can be considered additive rather than multiplicative. In exemplary aspects, a way to accomplish making intermediate shading results additive involves carrying a color attenuation vector with each ray emitted by either sample process 110 or by shader 115. This attenuation vector tracks how each intersected primitive affects light from one or more sources that land at the intersection point of the ray and the primitive.

Thus, a ray data structure is provided for each ray that also includes the sample origin to which that ray will contribute and a color attenuation vector. With this information, it can be determined at any intermediate point during intersection testing what pixel that ray contributes and how predecessor intersections have affected the color of that ray (which is in a reverse order of how the light actually propagates in the scene, and how ray/primitive intersections affect such light).

Thus, in such a system, sample process 110 may maintain a sample buffer 111 (or multiple sample buffers) that represents colors of pixels as presently accumulated (i.e., as each child ray completes, its contribution is reflected individually in the sample buffer, without propagating up the tree). Also, sample process 110 may maintain a status of the rays in flight, as well as what information about pixel colors has been received at a given time from shader 115 during rendering of a scene.

Figure 2:
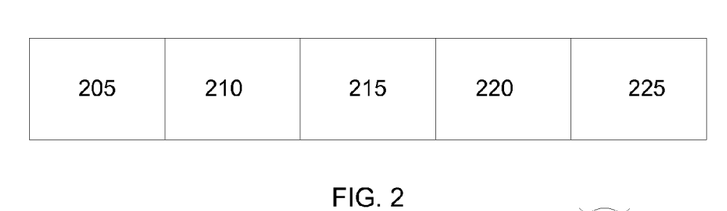
FIG. 2 illustrates a first ray tracing situation for discussion of certain adaptability aspects.

FIG. 2 depicts an example of a data structure 200 for representing a ray, and components of the data structure 205, 210, 215, 220, and 225 include sample identification 205, a ray direction 210, a ray origin 215, a color attenuation vector 220, and a weight 225.

In a convenient example, the color attenuation vector can be represented as attenuation from a pure white color in a color basis being used to represent colors during ray shading, so long as the numbers have a relationship which can be used to determine how a path of the ray from camera to the present ray would affect a color of light traveling along that path. Such color bases may use RGB or any other basis found useful or desirable. For example, considering the convenient example of RGB, pure white could be represented as [1 1 1], and may include a number of zeros reflecting the precision of the calculation scheme being used. Because RGB is a well-known color basis, it is used in describing some examples and aspects, but no aspect is limited to usage of RGB, as any other color basis can be used, including additive and subtractive color bases.

Figure 3:
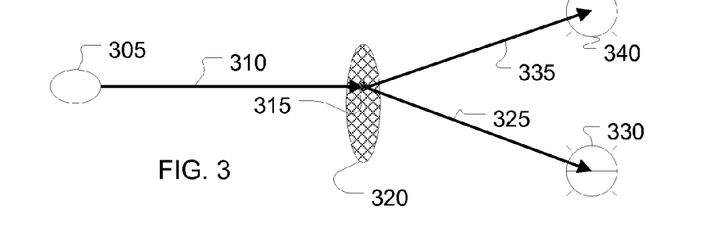
FIG. 3 illustrates a second ray tracing situation for discussion of other adaptability aspects.

FIG. 3 is used to explain aspects of how such color vectors can be used during ray tracing.

For context, the elements of FIG. 3 include a camera 305, a color filter 320, and lights 340 and 330. In the physical world, light emitted from lights 340 and 330 hits color filter 320, is filtered by color filter 320, and then some of the filtered light continues on to hit camera 305 (an image plane between camera 305 and primitive 320 is emitted in this example for simplicity). Ray tracing operates in reverse, such that a camera 305 emits a ray 310 for intersection testing. Ray 310 intersects color filter 320 at a primitive 315. Most conventional ray tracing operates by annotating this intersection as a node in a tree of intersections. Then, program code (e.g., a shader) causes child rays 325 and 335 to be emitted to test a color of light sources 340 and 330 and to determine whether these light sources are occluded (because this example is simplistic, many intervening ray/primitive intersections that would usually occur are omitted). In an RGB color basis example, if the child rays 325 and 335 hit respective light sources 330 and 340, then a color of each light (e.g., say light 340 is blue and light 330 is red) is propagated up the tree to the node representing the intersection of ray 310 and primitive 315. Then, the effect of the ray 310/primitive 315 intersection on the light of each light 340 and 330 is determined, which in turn determines a color of light to propagate back to camera 305. Assuming that color filter 320 were cyan, color filter 320 would filter out the red light and allow the blue light at a possibly reduced intensity.

In present aspects, camera 305 emits ray 310, and associated with the ray 310 is a color attenuation vector, which upon emission from camera 305 may be initialized as a pure white, e.g. [1 1 1]. Ray 310 hits primitive 315. Again, assuming that color filter 320 is cyan, color filter 320 physically would behave in the same manner as before. However, in present aspects, it is determined what affect color filter 320 (at primitive 315) would have on a color of light arriving at primitive 315 in advance, and that effect, along with the effects of other previous ray/primitive intersections, is represented in the color attenuation vector "carried" with the ray. Specifically, in this example, color filter 320 is cyan, while the color attenuation vector of ray 310 is white, so the affect of color filter 320 on ray 310 will be to filter out red light. This effect is recorded in the attenuation vector by reducing the red component. For example, in the RGB basis (Red Green Blue) color basis, the attenuation vector of ray 310 may start as [111]. An effect of primitive 315 on such vector may be represented as [011], reflecting elimination of the red light.

This updated color attenuation vector is then associated with child rays 325 and 335. Again, child rays 325 and 335 respectively hit lights 330 and 340. Colors of lights 330 and 340 were assumed to be red and blue, respectively. The attenuation vectors of child rays 325 and 335 represent how their ancestry (i.e., path from camera ray to the present) would affect camera light such that red is filtered out. Thus, light 330 is determined to have no contribution to the color of light at camera 305, while light 340 is blue, and thus, the color of light arriving at camera 305 would be blue. This determination can be effected by directly writing the color determined to a sample buffer, e.g., screen buffer 111. Stated differently, in these aspects, a ray can be viewed as a channel representing a differential attenuation of different colors of light in different proportions.

In a different example, assuming that both lights 340 and 330 were white, then child rays 325 and 335 would "arrive" at their respective lights, with the information that their ancestral path causes filtering of red light (attenuation vector [011]). Thus, contributions to the scene (i.e., to the pixel) light energy, for both lights 340 and 330, would be cyan, and such contribution would be written back to sample buffer 211 (assisted by the fact that with each child ray 325 and 335 there also is information specifying to what screen pixel each ray contributes).

In more complicated and realistic situations, there may be a number of intermediate ray/primitive intersections which affect the color attenuation vector of each respective ray involved in the intersection. However, the color attenuation vector for each ray maintains a history of how its path would affect a color of light which may travel on that path.

A variety of example adaptations and ray tracing modifications according to these disclosures use this form of light energy accounting. Any of these examples and implementations may use multiple sample buffers, and rays may be separately collected in each such sample buffer, and may move between sample buffers. As previously mentioned, any color basis found useful or desirable for a particular type of ray tracing or other circumstance.

In the first example describing how light energy is accounted for in these aspects, there was an example where a cyan color filter was intersected with a camera ray in a scene with two lights—one red and the other blue. Because it can be known in advance that the cyan color filter would filter out red light hitting it, a process that has information concerning colors of the lights in the scene, as well as the effect of primitive 315 (of color filter 320), can determine not to issue a child ray to determine whether the red light is occluded by an intermediate object, such that primitive 315 is in shadow of the red light, because the red light would largely be filtered out anyway, making it irrelevant whether or not primitive 315 was occluded. Thus, an amount of rays issued for intersection testing in a scene can be reduced by not issuing rays whose ultimate contribution can be determined to be lower than a threshold. The circumstances for such situations may be most applicable to a simplistic light occlusion situation.

Of course, in more complicated materials, there may be some refraction and reflection that may cause some red light to come from primitive 315, such that occlusion may be of some interest. The existence of such a situation is determined by a shader for primitive 315, which, in these exemplary aspects, generates child rays for each indicated situation (e.g., reflection and refraction) and also records a strength or importance of each such situation as a weight in the respective child rays. For example, if a reflection from color filter 320 were very slight, then a child ray for reflection may be emitted with a much lower weight than the weight associated with ray 310 (aspects such as specular versus diffusiveness can be handled similarly). The weight thus represents a relative importance of a given ray to the shading of a particular primitive as well as to a camera ray from which it ultimately owes its existence (and to a sample to which it maintains a reference). Thus, adaptation of ray tracing can be implemented using the weights, as an example of relative importance of a ray to a sample, during rendering of a frame, as will be described below.

In the context of FIG. 1, intersection test resource 150 returns an identified intersection between ray 310 and primitive 315, a shader for primitive 315 issues child rays, and describes a relative contribution of each child ray to the affect of the primitive on light that would hit the primitive. These relative contributions can be represented by providing each child ray with a weight based on the weight of ray 310. Also, in exemplary aspects, an effect of each child ray's parent may be represented in the weight of each child. For example, the weight of ray 310 can be allocated among the child rays, such that the sum of weights of the child rays is about equal to the weight of ray 310. Then each child ray can also be intersection tested, and the shading/weighting process repeated.

Figure 4:
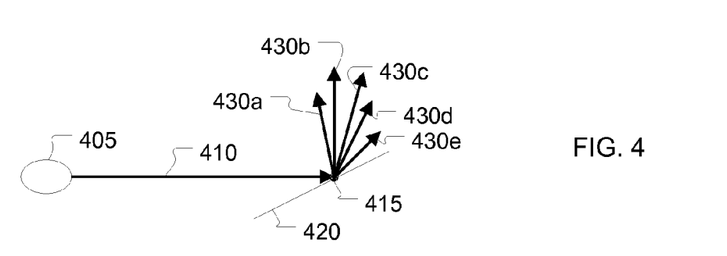
FIG. 4 illustrates a method including integration of adaptability aspects described with respect to FIGS. 3 and 4.

FIG. 4 illustrates a simplistic example of a camera 405 emitting a ray 410 that intersects an object 420 at a primitive 415. Determinations as to whether rays should be culled can be handled in a scalable and general manner with the example aspects presented below.

A shader associated with primitive 415 determines to emit child rays 430a-430e. The shader for primitive 415 would at least indicate a relative contribution for each of child rays 430a-430e. In an implementation, a weight of a parent ray (e.g., ray 410) can be distributed among child rays such that child ray weights sum about to the weight of the parent ray. However, weights of child rays are more generally determined at least in part by reference to a weight of a respective parent ray, without any requirement that weights of child rays sum about to a parent ray weight, or any other condition on normalization of child ray weights. A number of the rays emitted in this example could be computed as a Fresnel term. In an example of weight distribution, the weight of ray 410 is conserved such that the weights of child rays child rays 430a-430e sum to about the weight of ray 410. Such additional weight modifications can be considered part of the shader or as a process that receives inputs from the shader.

Weights of rays emitted from a particular sample may be made to correlate, sum to, or more broadly relate to a weight associated with the sample itself. The weight associated with the sample may be used to track an amount of light energy left to be accumulated for a particular sample/pixel. For example, if 10 camera rays were originally emitted for a sample, upon receiving color information for emissive primitives or lights accounting for a portion of the light energy expected to be accumulated in the scene, then the remaining sample weight may be commensurately reduced. A weight of a camera ray, as its ancestors are ray traced through a complicated scene, can become dispersed, such that many more rays may ultimately contribute to a sample than the number of camera rays originally emitted. Ray weights need not be strictly conserved, such that shaders may not propagate to child rays or contribute light energy that sums to an amount of light energy that may be represented by a ray being shaded. Thus, although ray weight may be conserved in some examples, implementations do not necessarily need to provide such functionality. For example, a programmer or 3-D artist may desire to achieve a certain effect, and may do so by assigning weights to rays in ways that may not maintain physical accuracy. For example, weights of child rays emitted from a shader may sum to more or less than a weight of a parent ray. In some situations, computation directed to adherence to more physically accurate ray tracing principals may not be warranted by an amount (if any) of subject quality gained.

Prior to providing child rays for intersection testing intersection testing resource 150, determinations concerning whether all child rays 430a-430e should be intersection tested can be made.

In an example aspect, the weight associated with each ray is used in determining whether that ray should be tested for intersection. For example, a rendering system according to described aspects may allow selection of goal priorities, such as scene quality, or rendering speed, such as a desired frame rate, for example. A weight threshold value for ray/primitive intersection processing can be set and periodically revised in furtherance of the prioritized goal. The threshold value may be used to determine whether a given child ray should be intersection tested or not.

For example, if rendering speed is prioritized, then maintenance of a desired frame rate is considered more important than achieving the best quality scene possible, although it is still desirable to retain as much quality as possible, within the parameter of frame rate maintenance. In such a circumstance, there may be more rays to process in a given timeframe than resources to process them, and so it may be desirable to avoid using processing resources on rays that have relatively low importance to a scene rendering, and in some examples, this importance is measured by a respective weight associated with each ray.

Returning to the example of FIG. 4, assuming that respective lengths of the arrows representative of the rays 430a-430e are representative of relative sizes of values of the weights associated with the rays, it may be determined that ray 430e has a weight too small to merit further processing, and that ray can be abandoned rather than processed for intersection test. This example is of a situation where a shader for primitive 415 does not receive information indicative of a priority (e.g., render speed) during rendering, and can run without such considerations. However, shaders can be written that allow inputs of weighting information that can be used to determine how many rays should be instantiated by the shader (as opposed to instantiation, and then culling of them).

Also, shading algorithms can be selected based on a weight of a parent ray (e.g., a shading algorithm that results in emission of child rays 430a-430e) can be selected based on a weight of parent ray 410. If parent ray 410 has a relatively high weight, then it can be deemed relatively important to the scene being rendered. A weight for a given ray can be judged based on statistical sampling or tracking of ray weights. For example, sample process 110 can track distributions of weights currently being intersection tested by for example maintaining a moving average of such weights, or bins of how many rays are within certain weight brackets, or some other acceptable means to understand a distribution of ray weights.

For example, several algorithms having a range of computation cost and quality of results (presumably, a direct relationship) may be available to perform a certain lighting function, and if parent ray 410 has a relatively higher weight, then a computationally more expensive, but better quality algorithm may be selected for shading that primitive.

By further example, in other situations, a number of different lighting effects may be taken into account when determining a color of a particular primitive intersected, such as specular lighting, reflection, and refraction. In such circumstances, one or more types of child rays may be generated for each lighting effect. Each such child ray would have a weight associated with it, the value of which would be determined based at least on the weight of its parent ray (e.g., ray 410.) Here also, a weight of ray 410 may be conserved, such that a sum of weights of all the child rays sum to about the weight of ray 410. How the weight of ray 410 is distributed among the child rays can vary. As described above, these described aspects and examples do not require conservation or approximate conservation of parent ray weight after distribution to child rays, but rather more generally parent ray weight is used in determining child ray weight, where a sum of child ray weight may be more or less than a weight of the parent ray.

For example, if a shader determines that a specular light accounts for 20% of a total light effect at primitive 415, while diffuse lighting accounts for 50%, and refraction accounts for the other 30%, then the child rays emitted for each effect (specular, diffuse, and refraction) may as a group be assigned about 20%, 50%, and 30% of the weight of ray 410. Among each ray, the weight assigned to the group may further be equally subdivided. Other divisions are possible as well. For example, a weight for some rays of the diffuse lighting component can be more heavily weighted than other diffuse lighting rays. Statistical, pseudorandom, and/or random distribution of weights may be implemented. Where this shader is for a primitive of a surface that emits light as well interacting with it, some portion of the parent ray weight may be added or otherwise accounted for as being determined at the sample. In other words, because the primitive emits light, at least some portion of the light energy propagated on the parent ray would be from that emission, and can be added to the sample at that time. Such addition can include tracking a color and a relative amount of energy represented by that color, as well as blending a current color of a sample with the light energy to be added, to arrive at a current updated color.

By coordinating the assignment and interpretation of weights associated with rays, rendering system 100 allows for a wide variety of adaptive ray tracing behaviors relating to quality and speed of ray traced images, such that rendering system 100 can use system resources in ways that efficiently maintain subjective and objective scene quality. Rendering system 100 can also implement adaptations in ray tracing behavior to track to certain goals, such as maintenance of a minimum frame rate, as available resources for ray tracing fluctuate.

Another adaptation within the ambit of described aspects includes a diluting or concentrating of the importance of already issued rays. For example, 10 camera rays could be emitted that would contribute light energy to one pixel, and each could be directed to sample portions of the scene spaced apart at regular intervals. If a few of these rays run directly into a large primitive (e.g., a wall), then some of the camera rays may be unnecessarily. Because weights for the camera rays generally are determined in view of a number of rays emitted, if some of these rays are desired to be cancelled, the effect of the remaining rays should be commensurately increased. Such increase can be done by increasing weighting of color contributions for camera rays that already have completed, and when other rays complete, these can also be weighted more than their original sample weights would suggest. Otherwise, the rays could be identified in a storage area and their weights commensurately increased to account for the cancellation of some of the other camera rays. Such concentration functionality can apply to any situation where a number of similar rays were issued, but subsequently there is a determination that fewer rays are necessary to result in an acceptable quality rendering within the time and/or in view of other resources available.

Such functionality can also work in the obverse, where it is determined for one reason or another that more rays should be emitted to refine a color of a sample. Such a determination can result from identifying that more processing resources are available than otherwise thought or where results are found to be insufficiently accurate given a complexity of the scene being rendered (perhaps variances between colors returned from similar rays are too large, for example). In such a case, more rays can be emitted from a given sample, and weights for colors of rays that already were contributed to that sample can be commensurately reduced. Weights for rays being intersection tested can be adjusted if the rays are accessible where stored, or appropriate adjustments to the ray weighting can be done after each ray completes processing and returns color information. Thus, in these aspects, light energy may already have been contributed to a sample (e.g., in response to encountering an emissive shader) for some rays that reference that sample, and the relative importance of the light energy contributed by those rays may be adjusted after such contribution to implement an adaptation to the ray tracing affecting that sample.

Figure 5:
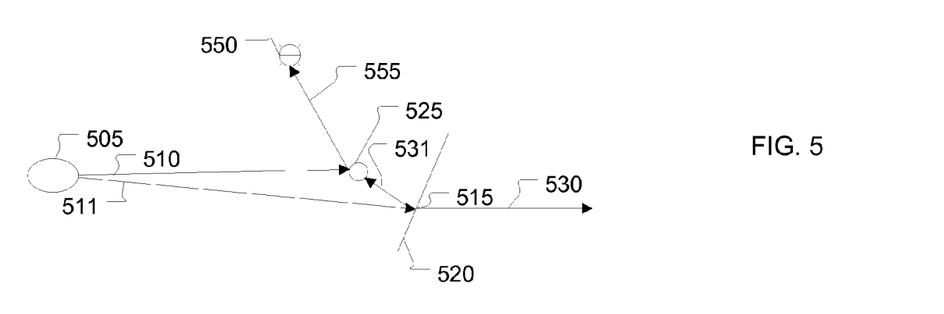
FIG. 5 illustrates a computer system that may include a hardware accelerated intersection testing resource according to FIG. 1.

Another example of how ray tracing adaptivity during ray tracing is provided with respect to FIG. 5. FIG. 5 illustrates a source 505 of ray 510 and ray 511. Ray 510 directly intersects object 525 (at a primitive not identified) while ray 511 directly intersects object 520 at primitive 515. Each intersection would be indicated to a shader process, as described above. The ray 510 directly intersects object 525, the shader for that object (or perhaps more particularly, the shader for the surface of object 525 at the primitive intersected) runs and may generate a ray 555 for testing specular lighting from light 550 (e.g., a surface of object 525 can be somewhat shiny). The shader for this ray/primitive intersection may also generate other rays or request other calculations such as diffuse lighting. More complicated surfaces may also have additional rays generated for additional aspects like subsurface scattering, which may require generation of additional rays. A significance of described adaptability aspects will be described after further description of the ray/primitive 515 intersection.

Ray 511 intersects object 520 at primitive 515, which would cause a shader for primitive 515 to run. For this example, assume that object 520 is composed of a glass, such that a shader for object 520 would generate both a transmission ray 530 for tracing as well as a reflection ray 531. In this example, the shader would cause a weight associated with ray 511 to be used in determining a respective weight for each of ray 530 and ray 531. Given the reasonably direct incidence of ray 511 to a surface normal of object 520, the shader would likely assign a higher weight to transmission ray 530 than to reflection ray 531. Reflection ray 531 then would be traced and it would be determined that it also intersects object 525 at a back side. Now, because a weight of ray 511 was divided (for example) among ray 531 and ray 530, the weight for ray 531 would be smaller than a weight of ray 510 (generally the case, if for example, both ray 511 and ray 510 are camera rays). The physical effect of this situation is that there may be a slight reflection of the back side of object 525 in object 520, while the portion of object 525 intersected by ray 510 is visible directly from ray source 505.

Thus, a shader process for ray 510/object 525 intersection may have access to the weight associated with ray 510, and in one example, would be able to determine, based on the associated weight, that accurate shading is required, and would operate accordingly to determine accurately more aspects of lighting that affect a color of the object. By contrast, the shader for the intersection of object 525 and ray 531 (could be another instantiation of the same shader process) would also see that ray 531 is associated with a much lower weight, and in response, might only perform a diffuse lighting call, and completely forgo more computationally expensive ray tracing.

Alternatively, each shader process could operate the same, regardless of incoming ray weight, and then management process 130 could cull rays based on weights associated with the rays outputted from each shader process. Either implementation can provide adaptivity according to these aspects, because relative sizes of weights emitted from each shader process (e.g., specular rays from each shader process) in the management process 130 implementation would still reflect that a weight of respective parent rays (510 and 531) were different, with ray 510 having a higher weighting. However, an aspect of these example implementations of note is that a measure of importance of the ray to the scene can be referenced by a shader process or by a management process to modify how much effort should be expended to accurately determine a color at the point intersected by that ray. A convenient implementation is to use a weight carried with a data structure representing the ray (e.g., FIG. 2), where that ray is used at least in part for determining weights of child rays for that ray (e.g. child reflection and child transmission rays). Generally, child ray weights would be determined at least to maintain continuity of relative importance of the parent rays.

Figure 6:
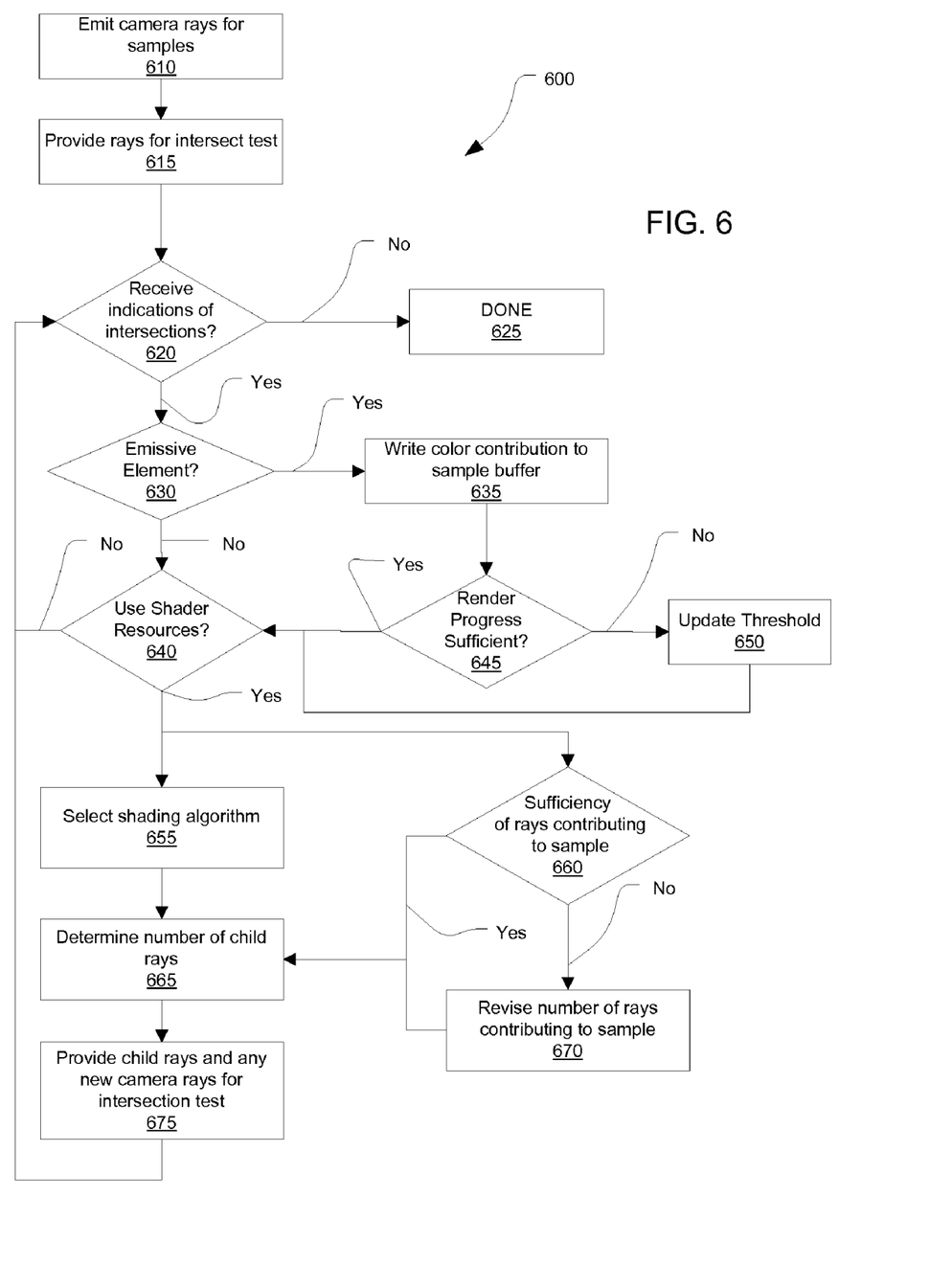
FIG. 6 illustrates an example method incorporating example adaptations outlined in the description.

The following example method 600 depicted in FIG. 6 summarizes the example adaptations outlined above, which included for example ray culling, dilution, concentration, and selection of shading algorithms based on ray weights. Multiple of these aspects are illustrated in the method of FIG. 6, but any of them can be used in isolation or in a sub-combination.

Method 600 includes emitting (610) camera rays from samples, and providing (615) those rays for intersection testing. Method 600 then includes receiving indications of identified intersections (620), and upon receipt, it is determined (630) whether the primitive or other element (e.g., a light) intersected is emissive, and if so then a color contribution is written (635) back to the sample buffer location identified by the ray identified in the intersection. If the element is not emissive, then it is determined (640) whether to use shader resources in shading the ray/primitive intersection based at least in part on the weight associated with the ray. If resources are to be used, then a shading algorithm is selected (655) based on the ray weight, and an output of such algorithm may includes determining (665) a number of child rays to be emitted for further intersection testing. The child rays are provided (675) for further intersection testing. Potentially in parallel, it can also be determined (660) whether there are sufficient rays contributing to a given sample (which are identified with the sample location identifications included in each ray) and if not then the number of rays contributing to the sample are revised (670) either up or down depending on whether there was under or over sufficiency of rays. Any such new camera rays are then provided (675) for intersection test.

If rendering progress (step 645) was insufficient, then a threshold used in determining whether to use shading resources, and selecting shading algorithms can be updated 650, such that fewer rays are shading and/or more simplistic shading algorithms are used. If there was an "over" sufficiency, then the threshold can be lowered such that higher quality shading algorithms and/or more rays can be shaded, or more child rays emitted, etc. Failure to receive intersection indications can be an indication that rendering of the scene is completing 620. Of course, such a determination may be handled by a process running in host processor 105, and receipt of such indications also can be an indication that more rays should be submitted for intersection testing, or the like.

In sum, the examples and aspects described provide mechanisms for adapting ray tracing at a granular level during rendering of a scene (e.g., a frame in a sequence of image frames). Such adapting can be done in furtherance of goals, whether default goals, or explicitly selected goals. The usage of weights associated with rays for use in determining importance of the rays to scene rendering provides an example of how a granular determination of ray importance can be made, and information for use in such determinations tracked from parent to child ray, and so on. However, other implementations for such importance tracking may be provided, and adaptive ray tracing may be based on these implementations.

To arrive at a rendered image, light energy ultimately is contributed to a sample associated with a ray (referenced with respect to steps 630 and 635 of method 600), in response to that ray encountering an emissive element, which generally would be any primitive associated with program code that causes emission of light. Thus, emissive elements may include examples such as a light with a lens or a television screen, where these items may reflect light from elsewhere, while also emitting light, and emissive elements thus are not solely emissive, but can have complex light interactions. Thus, a shader for an emissive element, when shading a given ray/primitive intersection, may cause light energy to be added to the sample associated with the ray, where that light energy represents an emissive component of that shader. The shader may also cause various other rays to be emitted, as described above. In some cases, the light energy represented by the emissive component and the other rays emitted can be about an amount of light energy represented by a parent ray, or it can be more or less, depending on a desired effect. Sample process 110 may track light energy added to each sample, such that it maintains data sufficient to determine a relative effect of newly added light energy to the color of the light energy already added. For example, sample process 110 may maintain a weight associated with the sample which tracks additions of light energy, and can for example be referenced to determine a relative effect of newly added light energy to what was already added (e.g., if a weight associated with an emissive component of a shaded ray is slight, while a lot of light energy already has been added to the sample associated with that shaded ray, then the color of that sample would not change much. In a different example, a weight of ray could be made by a shader to be larger than what might be expected; such a circumstance would be represented by an expectedly large effect of that ray on the sample, but would not violate any explicit or implicit requirement for implementing the ray weight contribution aspects disclosed herein.

As described in some detail above, adaptivity based on ray importance, and in more particular aspects, based on ray weight, can be implemented after emission of rays by a shader process, such that the shader process need not be aware or specifically consider importance of a given ray being shaded when determining, for example, how many child rays to emit for that parent ray. Sometimes, shaders can call common lighting calculation utilities, rather than duplicating that code. This can provide for increased shader portability and modularity. For example, shaders may call lighting utilities for diffuse and specular lighting calculations. These utilities may implement adaptations according to the above-described aspects. For example, these utilities may use ray weight information in determining what type of algorithm to use for its lighting effect, and may use a more accurate, but computationally expensive effect for more important rays. As can be discerned, the shader calling the utility need not be aware of how returned lighting information was calculated, and can simply use it.

Still further implementation variations can include a management process that receives shader process outputs, such as child rays that the shader process would like intersection tested. The management process may determine whether any, all, or some portion of these child rays should actually be intersection tested. The management process may have visibility to a system utilization, and can determine whether a current system utilization can support such intersection testing without causing detrimental effects. Such detrimental effects can include failing to maintain a frame rate goal, or intersection testing lower importance rays at the expense of higher importance rays, which may cause unnecessary rendering quality degradation in constrained resource processing.

In still further variations, a shader process can be passed information about current resource utilization, and the shader process can use that information in determining how the present ray/primitive intersection should be shaded, based also on an importance of the ray, as may be determined by a ray weight. As can be discerned, a variety of implementation possibilities exist for adapting ray tracing, even during intra-frame rendering. Some such implementations can rely more on centralized management of rays being shaded while others can distribute usage information more broadly, resulting in more decentralized control.

Another item of general applicability is that a shading algorithm selection for a given ray/primitive intersection can be based on importance of the ray, as well as indicia of result quality achieved by the algorithm. Sometimes, quality of results of a particular algorithm can depend on what type of ray tracing is being performed. For example, quality of results of such algorithms may depend on what outputs are of interest from the ray tracing being performed, and as such, any given shading algorithm may be judged to give a different "quality" of result in different circumstances. For example, tracing light in different spectrums may warrant rating a given algorithm with different qualities of results for different light spectrums. Therefore, such algorithms may also be associated with ranges of qualities or mappings of qualities to usages. Ratings of such algorithms also may relate to subjective versus objective quality assessments.

Aspects of methods described and/or claimed may be implemented in a special purpose or general-purpose computer including computer hardware, as discussed in greater detail below. Such hardware, firmware and software can also be embodied on a video card or other external or internal computer system peripheral. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, pagers, and the like.

The described methods and systems would exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

Figure 7:
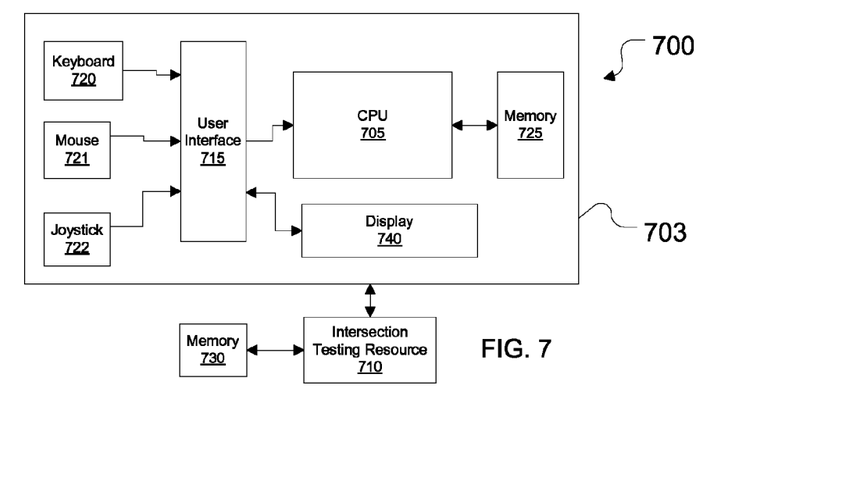
FIG. 7 illustrates an example computer system.

For example, computer system 700 comprises a host system 703 which comprises a CPU 705 interfacing with a memory 725 and a user interface 715 that may receive input from keyboard 720, mouse 721, and joystick 722, for example, and provide output to display 740. Host system 703 interfaces with hardware accelerator 710, which comprises logic 711 interfacing with onchip memory 712 (e.g., SRAM) and offchip memory 730 (e.g., DRAM). The combination of logic 711 and memory 712 may implement the ITUs described above. Software runs on CPU 705, including a driver for hardware accelerator 710. The driver would provide rays to logic 711, and would receive identified ray/primitive intersections to be used in shading calculations, and other calculations necessary for production of a rendered scene for display. Memory 730 may provide storage for geometry acceleration data, and primitives. These also be may be received from host 703.

Figure 8:
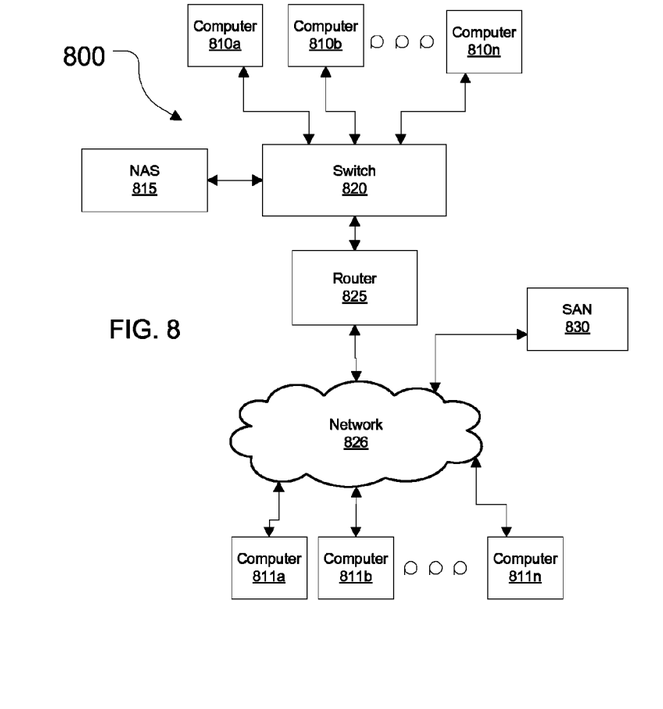
FIG. 8 illustrates a rendering farm that may employ computer systems according to FIG. 5.

FIG. 8 illustrates a rendering farm 800 comprising a plurality of computers 810a-810n, any subset of which, or all according to the computing system 700 of FIG. 7. The computers 810a-810n are connected on a LAN by switch 820, which connects to router 825 and to network area storage (NAS) 815. Router 825 connects to network 826, which may be an internet, the Internet, a private network, or some combination thereof. Network 826 provides access to storage area network resources 830, and to other computers 811a-811n, which also may be equipped with hardware accelerators 510. Where a large amount of rendering is required, such a render farm may be employed to distribute rendering among multiple processing resources.

In this description, a "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

In some examples and aspects, some values, such as weights associated with rays, have been related to other values, such as a weight associated with a sample from which the rays were emitted (or in the case of descendents of camera rays, by inheritance of an associated sample from a parent ray) Any such numerical relationships can be additional, such that a sum of ray weights is about that of a sample weight, for example, or such relationships can be made more complex or less apparent without distinguishing the aspects described herein. Also, example disclosures relating to adaptation based on ray weights described adaptations based on a ray being considered, either for culling or to be a parent of additional child rays, or as a peer for rays further rays to refine a contribution of the ray. These examples focused on the weight of the ray being considered; however, aspects disclosed herein encompass adaptations based on ray weights in any generalized manner, such that a weight of a particular ray may not be considered in a particular instance for culling or other processing related to that ray.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

This description is exemplary and it will be apparent to those of ordinary skill in the art that numerous modifications and variations are possible. For example various exemplary methods and systems described herein may be used alone or in combination. Additionally, particular examples have been discussed and how these examples are thought to address certain disadvantages in related art. This discussion is not meant, however, to restrict the various examples to methods and/or systems that actually address or solve the disadvantages.

We claim:

1. A non-transitory computer readable medium storing computer readable instructions for machine execution of a method for adaptively ray tracing a three-dimensional scene composed of primitives using intermediate ray shading results, the method comprising:

emitting rays from a plurality of samples, each ray associated with a respective identification of a location of the sample from which it was emitted, a direction, and a weight;

providing a subset of the rays for intersection testing with primitives;

receiving an indication of an identified intersection between a ray and a primitive, the indication associated with information sufficient to identify the ray intersected and one of the rays and the primitive which the ray intersects; and responsive to receiving each indication, processing the identified intersection between the identified ray and the identified primitive, the processing including determining, based at least on the weight of the ray identified in the indication, a ray tracing adaptation comprising selecting further rays for intersection testing based on a comparison of the weight associated with the ray identified by the indication, and weights associated with rays that have been emitted and for which definition data is stored in a memory, but for which an intersection has not yet been received.

2. The computer readable medium of claim 1, wherein a sum of the weights of the rays emitted from each sample sums approximately to a weight associated with that sample.

3. The computer readable medium of claim 1, wherein the ray tracing adaptation further comprises includes culling one or more rays of the subset of rays, and adjusting a weight associated with the sample to which the subset relates to maintain an approximately constant light energy accumulation in the sample.

4. The computer readable medium of claim 1, wherein the ray tracing adaptation further comprises determining to emit new rays from a selected sample of the plurality, and adjusting the weight of each ray associated with the selected sample to account for the new rays.

5. The computer readable medium of claim 1, wherein the ray tracing adaptation further comprises determining child rays to be emitted, and respective weights of the child rays to be emitted by distributing a value of the weight of the ray identified in the intersection among the weights of the child rays.

6. The computer readable medium of claim 5, wherein a shader determines a number of child rays by determining a first number of child rays for specular reflection and a second number of child rays for refraction.

7. The computer readable medium of claim 1, wherein the weight comprises a scalar value and the method further comprises selecting a shading algorithm for the ray that determines a number of child rays to be emitted from the intersection, the shading algorithm selected based on comparing the scalar value of the weight of the identified ray against a threshold value.

8. The computer readable medium of claim 7, wherein the method further comprises determining the threshold value by reference to available system resources and a number of rays expected to be processed within a determined period of time.

9. The computer readable medium of claim 8, wherein the determined period of time relates to a time allocated for rendering one frame of a sequence of frames.

10. The computer readable medium of claim 8, wherein the method further comprises updating the threshold value during rendering of a frame, the threshold value being raised when one or more of availability of system resources decreases and the number of rays expected to be processed during a remaining period of time is greater than expected.

11. The computer readable medium of claim 1, wherein each ray being intersection tested is also associated with a color attenuation vector that represents how light traveling on a path from a present ray location back to a sample associated with the respective ray would be modified, the method further comprising updating the color attenuation vector to account for an effect of the primitive identified by the indication on the light traveling on the path.

12. The computer readable medium of claim 1, wherein the determining further comprises, determining, based at least on the weight of the ray identified in the indication, whether to use system resources for determining an effect on a color of light from the primitive, and if system resources are to be used, then using those resources to determine such effect.

13. The computer readable medium of claim 1, wherein the method further comprises selecting a shading algorithm to use in determining the color of the primitive based at least in part on the weight of the identified ray, and if the identified ray has a larger weight, then a more accurate shading algorithm is selected, and if the identified ray has a smaller weight, then a faster shading algorithm is selected.

14. Non-transitory computer readable medium storing computer readable instructions for machine execution of a method for adaptive ray tracing, the method comprising:
    storing data for a plurality of rays in a buffer, the data for each ray comprising a respective weight value;
    providing subsets of the stored plurality of rays for intersection testing with primitives during rendering of a frame of 3-D scene, the rendering comprising intersection testing of rays stored in the buffer and shading detected intersections between rays and primitives composing the 3-D scene;
    maintaining a statistic concerning values of weights for rays stored in the buffer;
    receiving indications of identified intersections between rays and primitives, the indication associated with information sufficient to identify one of the rays and the primitive which the ray intersects; and
    controlling the rendering based on a comparison between weights associated with rays identified in the indications and the statistic concerning values of weights for rays stored in the buffer.

15. The computer readable medium of claim 14, wherein the method further comprises determining a ray tracing adaptation based at least in part on the weight of the identified ray, wherein the ray tracing adaptation includes determining to refine the color of the light energy contributed by the identified ray, and in response to determining to refine, emitting further rays from the sample from which the contributed ray was emitted.

16. The computer readable medium of claim 14, wherein a shader operates by emitting a plurality of child rays for intersection testing, and the ray tracing adaptation includes adjusting a number of the child rays actually provided for intersection testing.

17. A non-transitory computer readable medium storing computer readable instructions for machine execution of a method for adaptive ray tracing, the method comprising:
    emitting rays from a plurality of samples, each ray associated with a respective identification of a location of the sample from which it was emitted, a direction, and a weight;
    providing the rays for intersection testing with primitives;
    receiving indications of identified intersections between rays and primitives, the indication associated with information sufficient to identify one of the rays and the primitive which the ray intersects;
    in response to receiving each indication,
        considering, as a group, the rays associated with the sample associated with the indicated ray,
        determining whether the rays currently associated with the sample are sufficient to determine a color of the sample; and
        changing an amount of rays to be intersection tested that are associated with the sample in response to determining that the rays currently to be intersection tested that are associated with the sample are either under sufficient or over sufficient to determine a color of the sample.

18. The computer readable medium of claim 17, wherein sufficiency requires higher quality rendering for primitives directly visible from the sample from which the ray was emitted.

19. The computer readable medium of claim 18, wherein the method further comprises comparing a weight value associated with the ray against a threshold value and using the result of that comparison in the determining that the rays currently to be intersection tested that are associated with the sample are either under sufficient or over sufficient to determine a color of the sample, and updating the threshold value responsive to changes in availability of system resources.

20. A non-transitory computer readable medium storing instructions for a computer implemented method of controlling adaptive rendering of a scene composed of primitives, the method comprising:
    determining a plurality of rays to emit for intersecting testing during rendering of a two-dimensional image of a three-dimensional scene composed of primitives;
    associating each of the rays with a respective scalar weight value;
    storing a subset of the plurality of rays in a buffer accessible by an intersection testing resource;
    receiving an indication of an intersection between the a ray of the and one of the primitives composing the scene;
    determining a relative importance of the indicated ray to the scene rendering by comparing the weight value associated with the indicated ray with a threshold value; and responsive to the determining the relative importance, selecting further rays, from the plurality of rays, to be stored in the buffer emitted for intersection testing.

21. The computer readable medium of claim 20, wherein the method further comprises determining an algorithm which controls the selection of rays, the determining of the algorithm based at least in part on a metric relating to scene rendering progress and the relative importance of the indicated ray.

22. The computer readable medium of claim 21, wherein the algorithm is further determined based on a metric relating to scene rendering quality.

23. The computer readable medium of claim 22, further comprises updating the progress metric and the quality metric during rendering of a frame of a sequence of frames rendering the scene.

* * * * *